United States Patent [19]

Ohtani

[11] 4,250,956
[45] Feb. 17, 1981

[54] VEHICLE AIR CONDITIONING APPARATUS

[75] Inventor: Masami Ohtani, Higashi Matsuyama, Japan

[73] Assignee: Diesel Kiki Company, Ltd., Tokyo, Japan

[21] Appl. No.: 75,482

[22] Filed: Sep. 14, 1979

[30] Foreign Application Priority Data

Sep. 29, 1978 [JP] Japan ............................. 53-119990

[51] Int. Cl.³ ...................... G05D 23/00; B60H 3/04; F25B 29/00
[52] U.S. Cl. ...................................... 165/36; 62/159; 62/239; 165/23
[58] Field of Search ...................... 165/23, 36; 62/239, 62/159

[56] References Cited

U.S. PATENT DOCUMENTS

| 3,263,739 | 8/1966 | Gaskill et al. | 165/23 |
| 3,428,115 | 2/1969 | Caldwell | 165/23 |
| 3,662,818 | 5/1972 | Snyder | 165/23 |
| 3,802,490 | 4/1974 | Jacobs | 165/23 |

Primary Examiner—Lloyd L. King
Attorney, Agent, or Firm—David G. Alexander

[57] ABSTRACT

A temperature control door (27) controls air flow through a duct (12) and is positioned in accordance with the output of a sensor (41), (42). A slider (74) of a potentiometer (72) is connected to the door (27) so that the slider (74) is in a central position when the temperature control door (27) is in a central position. A switch (86) connects the slider (74) to one end of a resistance element (73) of the potentiometer (72) when the temperature control door (27) is on one side of the central position and the apparatus (11) is in a cooling mode and to the other end of the resistance element (73) of the potentiometer (72) when the temperature control door (27) is on the other side of the central position and the apparatus (11) is in a heating mode. The speed of a blower (16) which forces air through the duct (12) is controlled in accordance with the resistance of the potentiometer (72). A switch (87) controls the blower (16) to run a maximum speed when the apparatus (11) is in a maximum cooling mode.

8 Claims, 4 Drawing Figures

VEHICLE AIR CONDITIONING APPARATUS

BACKGROUND OF THE INVENTION

The present invention relates to an air conditioning apparatus for an automotive vehicle or the like.

A typical vehicle air conditioning apparatus comprises a duct and a blower for forcing air through the duct. An evaporator of a cooler and a core of a heater are disposed in the duct and are selectively utilized. A movable temperature control door controls air flow through the evaporator and core and thereby the temperature of air flowing through the duct. The temperature control door is positioned in accordance with sensed air temperature.

It is desirable to control the speed of the blower to be low when there is little difference between the sensed temperature and the desired temperature. When this occurs, the temperature control door is in a central position. As the difference between the sensed temperature and the desired temperature increases indicating a need for air conditioning, the temperature control door is moved in one direction or the other depending on the temperature difference. It is desirable under these conditions to increase the blower speed to facilitate a faster change in temperature. It is also desirable to make the blower speed maximum when the apparatus is in the maximum cooling mode.

Typical air conditioning systems are disclosed in U.S. Pat. Nos. 3,263,739 and 3,662,818 which constitute the closest known prior art. Means are disclosed for automatically controlling the blower speed as a function of the position of the temperature control door. However, said means comprise a complicated arrangement of variable resistors, contacts and the like which is expensive to manufacture, takes up a disproportionate amount of space and is prone to frequent malfunction. In addition, these prior art disclosures do not comprise any means for automatically driving the blower at maximum speed when the apparatus is in the maximum cooling mode.

SUMMARY OF THE INVENTION

An air conditioning apparatus includes an air flow duct, a blower for forcing air through the duct, a temperature control door disposed in the duct, temperature sensor means and actuator means for positioning the temperature control door in accordance with an output of the temperature sensor means, and is characterized by comprising resistance means comprising a resistance element and a slider movable along the resistance element, the slider being connected to the temperature control door for integral movement in such a manner that the slider is in a central position on the resistance element when the temperature control door is in a central position, blower drive means for driving the blower with an amount of power corresponding to a resistance of the resistance means, and switch means for connecting the slider to opposite ends of the resistance element when the temperature control door is on opposite sides of the central position thereof respectively.

In accordance with the present invention, a temperature control door controls air flow through a duct and is positioned in accordance with the output of a sensor. A slider of a potentiometer is connected to the door so that the slider is in a central position when the temperature control door is in a central position. A switch connects the slider to one end of a resistance element of the potentiometer when the temperature control door is on one side of the central position and the apparatus is in a cooling mode and to the other end of the resistance element of the potentiometer when the temperature control door is on the other side of the central position and the apparatus is in a heating mode. The speed of a blower which forces air through the duct is controlled in accordance with the resistance of the potentiometer. A switch controls the blower to run a maximum speed when the apparatus is in a maximum cooling mode.

It is an object of the present invention to provide a vehicle air conditioning apparatus comprising improved means for controlling the speed of a blower in accordance with the degree of heating or cooling required.

It is another object of the present invention to provide a vehicle air conditioning apparatus comprising automatic means for driving a blower at maximum speed when the apparatus is in a maximum cooling mode.

It is another object of the present invention to provide a vehicle air condition apparatus which operates in a reliable and efficient manner, is less expensive to manufacture on a commercial production basis and is less prone to malfunction than comparable apparatus in the prior art.

It is another object of the present invention to provide a generally improved vehicle air conditioning apparatus.

Other objects, together with the foregoing, are attained in the embodiments described in the following description and illustrated in the accompanying drawing.

DESCRIPTION OF THE PREFERRED EMBODIMENTS

While the vehicle air conditioning apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
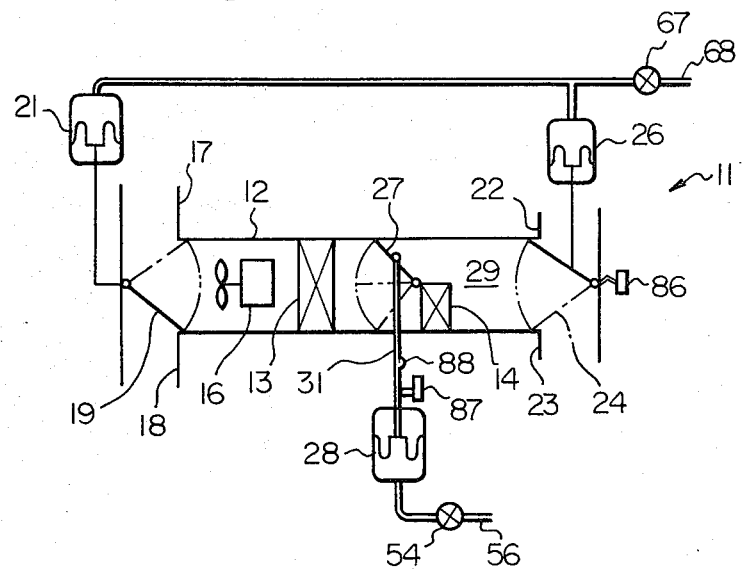
FIG. 1 is an overall schematic view of a vehicle air conditioning apparatus embodying the present invention.

Referring now to FIG. 1 of the drawing, a vehicle air conditioning apparatus embodying the present invention is generally designated by the reference numeral 11 and comprises an air flow duct 12. An evaporator 13 for cooling air and a heater core 14 for heating air are disposed in the duct 12. A variable speed blower 16 is also disposed in the duct 12 for forcing air to flow therethrough from left to right as viewed in the drawing.

Air is introduced into the duct 12 from either an outside air inlet 17 or an inside (recirculated air) inlet 18. A door 19 is moved by a pneumatic actuator 21 between a phantom line position and a solid line position to block one of the inlets 17 or 18.

Air is discharged into the passenger cabin of an automotive vehicle (not shown) through either an upper cool air outlet 22 or a lower hot air outlet 23. A door 24 is moved by a pneumatic actuator 26 to block one of the outlets 22 or 23. Further disposed in the duct 12 is a temperature control door 27 which is positioned by a pneumatic actuator 28 in accordance with sensed temperature between an upper solid line position which completely blocks a bypass passageway 29 above the heater core 14 and forces all air to flow through the core 14 and a lower phantom line position which completely blocks the heater core 14 and causes all air to flow through the bypass passageway 29. The actuator 28 is connected to the door 27 by a rod 31.

As will be described in detail below, a sensor senses the temperature inside and outside the vehicle cabin. The actuators 21, 26 and 28 are controlled to position the doors 19, 24 and 27 in accordance with the sensed temperatures.

When the sensed temperature is higher than a desired temperature, the apparatus 11 is controlled to operate in the cooling mode. The door 19 is moved to block the inlet 17 so that only recirculated air from the vehicle cabin is allowed to enter the duct 12 through the inlet 18. The door 24 is moved to block the outlet 23 so that all air is forced to flow out of the duct 12 through the upper cool air outlet 22. The door 27 is moved to a position between a central phantom line position and the lower phantom line position to allow a variable amount of air to flow through the bypass passageway 29. The evaporator 13 is activated to cool the air flowing through the duct 12 and the heater core 14 is deactivated.

When the sensed temperature is lower than the desired temperature, the apparatus 11 is controlled to operate in the heating mode. The door 19 is moved to block the inlet 18 so that only outside air is allowed to enter the duct 12 through the inlet 17. The door 24 is moved to block the outlet 22 so that all air is forced to flow out of the duct 12 through the lower outlet 24. The door 27 is moved to a position between the central phantom line position and the upper solid line position to allow a variable amount of air to flow through the heater core 14. The more air that flows through the heater core 14, the larger the heating effect. The heater core 14 is activated and the evaporator 16 is deactivated.

FIG. 27 illustrates the speed of rotation of the blower 16 as a function of the position of the temperature control door 27. The maximum cooling effect occurs when the door 27 is in the lower phantom line position. The maximum heating effect occurs when the door 27 is in the upper solid line position. When the door 27 is in the central phantom line position it indicates that the temperature which is sensed is equal to the desired temperature and no air conditioning is necessary.

The blower 16 speed is controlled to be minimum when the door 27 is in the central position, and increases as the door 27 moves away from the central position in either direction. This increases the air flow and thereby facilitates rapid change of temperature. A provision is made so that the blower 16 is driven at a maximum speed during maximum cooling operation which is higher than a maximum speed during maximum heating operation.

Figure 4:
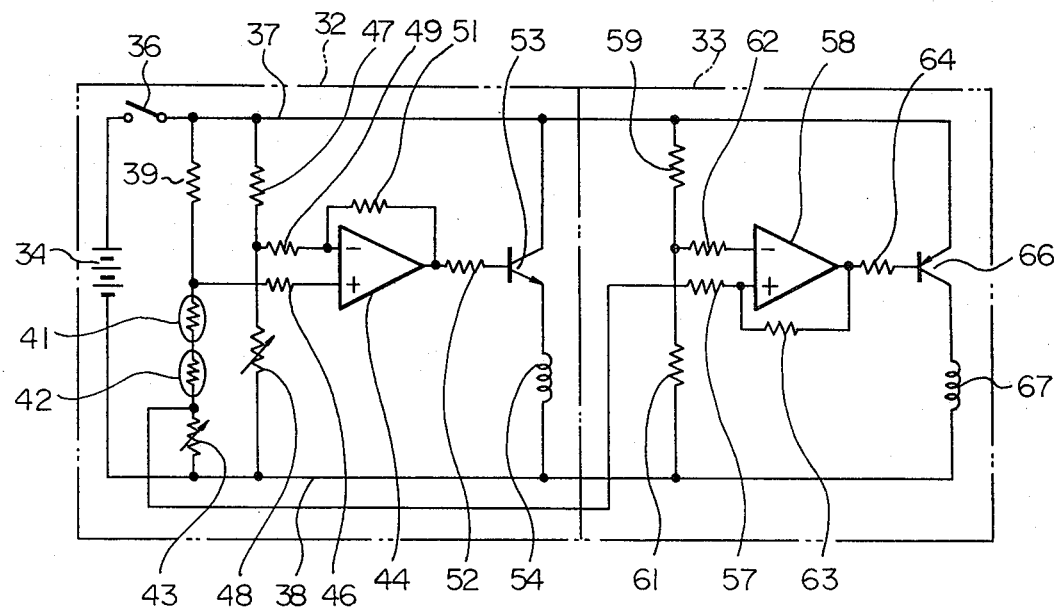
FIG. 4 is an electrical schematic diagram of a damper control circuit and a mode door control circuit of the apparatus.

Referring now to FIG. 4, there is illustrated a door control circuit 32 for controlling the temperature control door 27 and a door control circuit 33 for controlling the inlet and outlet doors 19 and 24 respectively.

The positive terminal of a battery 34 is connected through a key or ignition switch 36 to a positive bus line 37. The negative terminal of the battery 34 is connected to a negative bus line 38. A fixed resistor 39, thermistors 41 and 42 and a variable resistor 43 form a voltage divider between the bus lines 37 and 38. The slider of the variable resistor 43 is connected to the door 27 and constitutes a feedback means. The thermistor 41 is disposed outside the vehicle and the thermistor 42 is disposed inside the vehicle cabin. The voltage at the junction of the thermistor 41 and resistor 39 is applied through a resistor 46 to the non-inverting input of an operational amplifier 44 and varies in accordance with the resistances of the thermistors 41 and 42. Another voltage divider constituted by a fixed resistor 47 and a variable resistor 48 is connected across the bus lines 37 and 38 with the junction of the resistors 47 and 48 being connected to the inverting input of the operational amplifier 44 through a resistor 49. The voltage at the junction of the resistors 47 and 48 is a reference voltage corresponding to the desired temperature in the vehicle cabin. The slider of the resistor 48 is manipulated by the vehicle operator to adjustably set the desired temperature by means of a calibrated dial or the like (not shown).

The operational amplifier 44 is provided with a negative feedback resistor 51 connected between the output and inverting input so as to function as a proportional amplifier. The output of the amplifier 44 is connected through a resistor 52 to the base of an NPN transistor 53. The collector of the transistor 53 is connected to the positive bus line 37. The emitter of the transistor 53 is connected through a coil of a solenoid valve 54 to the negative bus line 38.

The solenoid valve 54 is disposed in a conduit 56 leading from a pressure or vacuum source (not shown) to the actuator 28.

When the sensed temperature is high indicating that the apparatus 11 should be operated in the cooling mode, the resistances of the thermistors 41 and 42 are low and the voltage at the non-inverting input of the amplifier 44 is lower than the reference voltage at the inverting input of the amplifier 44. The amplifier 44 produces a low output which causes the transistor 53 to conduct to a small extent which depends on the voltage at the non-inverting input of the amplifier 44. Thus, a small amount of current passes through the coil of the valve 54 and a low value of pressure is applied to the actuator 28. Thus, the temperature control door 27 is positioned close to the lower phantom line position to block the heater core 14 and provide a large cooling effect. As the sensed temperature drops down near the desired temperature, the resistances of the thermistors 41 and 42 increase and the voltage at the non-inverting input of the amplifier 44 increases. The amplifier 44 produces a higher output which turns on the transistor 53 to a larger extent and allows more current to flow through the transistor 53 and valve 54. The valve 54 opens to a larger extent, increasing the pressure applied to the actuator 28. This causes the door 27 to move toward the central phantom line position.

When the sensed temperature is below the desired temperature indicating that a heating operation must be performed, the resistances of the thermistors 41 and 42 are low and the voltage at the non-inverting input of the amplifier 44 is higher than the voltage at the inverting input thereof. The amplifier 44 produces a very high output which causes the transistor 53 to conduct to a large extent and allow a large amount of current to flow through the valve 54. The valve 54 opens to a large extent allowing a large value of pressure to be applied to the actuator 28. The actuator 28 moves the door 27 toward the upper solid line position to cause a large amount of air to flow through the heater core 14 and provide a large heating effect.

The junction of the variable resistor 43 and thermistor 42 is connected through a resistor 57 to the non-inverting input of an operational amplifier 58. A voltage divider consisting of resistors 59 and 61 connected across the bus lines 37 and 38 produces a reference voltage which is applied to the inverting input of the amplifier 58 through a resistor 62. The amplifier 58 is provided with a positive feedback resistor 63 connected between the output and non-inverting input which causes the amplifier 58 to function as a saturation amplifier. The output of the amplifier 58 is connected through a resistor 64 to the base of a PNP transistor 66. The emitter of the transistor 66 is connected to the positive bus line 37. The collector of the transistor 66 is connected through a coil of a solenoid valve 67 to the negative bus line 38. The valve 67 is disposed in a conduit 68 leading from the pressure source to the actuators 21 and 26.

When the sensed temperature is high, the voltage at the junction of the resistor 43 and thermistor 42 applied to the non-inverting input of the amplifier 58 is higher than the voltage at the inverting input of the amplifier 58. The amplifier 58 produces a high output voltage which is equal to the saturation voltage of the amplifier 58. This high voltage turns off the transistor 66 and prevents current flow through the valve 67. The valve 67 is closed and prevents pressure from being applied to the actuators 21 and 26. The actuator 21 moves the door 19 to the phantom line position to block the outside air inlet 17. The actuator 26 moves the door 24 to the phantom line position to block the hot air outlet 23. Under these conditions, the apparatus 11 is in the cooling mode.

When the sensed temperature is low, the voltage at the junction of the resistor 43 and thermistor 42 applied to the non-inverting input of the amplifier 58 is lower than the voltage at the inverting input of the amplifier 58. The amplifier 58 produces a high negative voltage. This negative voltage turns on the transistor 66 and allows a large amount of current to flow through the valve 67. The valve 67 is opened to a large extent and a large value of pressure is applied to the actuators 21 and 26. The actuator 21 moves the door 19 to the solid line position to block the recirculated air inlet 18. The actuator 26 moves the door 24 to the solid line position to block the cool air outlet 22. Under these conditions, the apparatus 11 is in the heating mode. It will be noted that the position of the door 24 corresponds to the heating or cooling mode.

Figure 2:
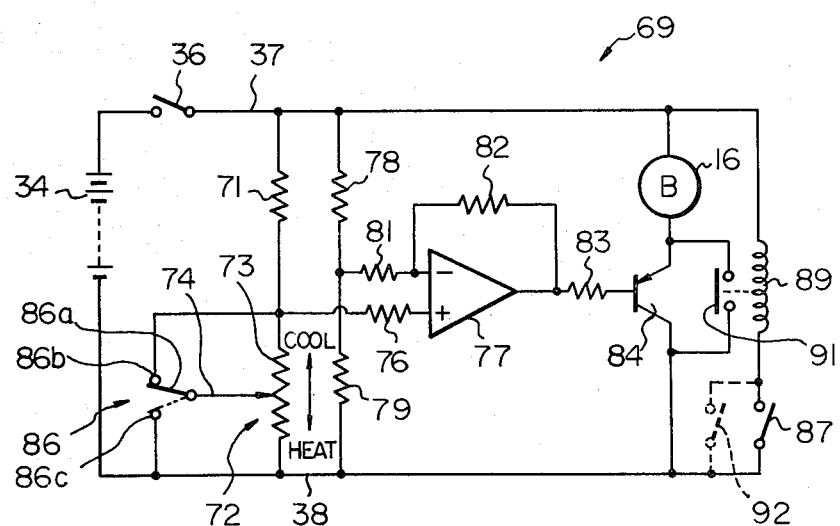
FIG. 2 is an electrical schematic diagram of a blower control circuit of the apparatus.
Figure 3:
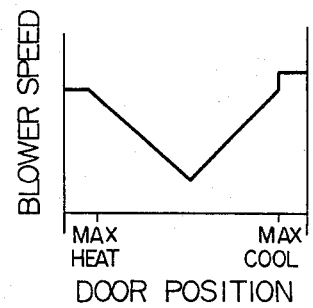
FIG. 3 is a graph illustrating the operation of the blower control circuit of FIG. 2.

A blower control circuit 69 is illustrated in FIG. 2 and comprises a fixed resistor 71 and a potentiometer or variable resistance means 72 connected in series across the lines 37 and 38. The potentiometer 72 comprises a resistance element 73 which is connected at its opposite ends to the resistor 71 and bus line 38 and a slider 74 which moves on the resistance element 73. The slider 74 is connected to the temperature control door 27 so that the slider 74 is in a central position on the resistance element 73 when the temperature control door 27 is in the central phantom line position. The junction of the resistor 71 and potentiometer 72 is connected through a resistor 76 to the non-inverting input of an operational amplifier 77. A voltage divider consisting of resistors 78 and 79 is connected across the lines 37 and 38 and produces a reference voltage which is applied to the inverting input of the amplifier 77 through a resistor 81. A negative feedback resistor 82 connected between the output and inverting input of the amplifier 77 causes the amplifier 77 to function as a proportional amplifier. The output of the amplifier 77 is connected through a resistor 83 to the base of a PNP transistor 84. The collector of the transistor 84 is connected to the bus line 38. The emitter of the transistor 84 is connected through a motor of the blower 16 to the bus line 37.

A switch 86 is connected so as to be actuated by the door 24, although the switch 86 could equivalently be connected to be actuated by the door 19 or the door 27. The switch 86 comprises a movable contact 86a which is connected to the slider 74 of the potentiometer 72, a fixed contact 86b which is connected to the junction of the resistance element 73 and the resistor 71 and a fixed contact 86c which is connected to the bus line 38.

When the apparatus 11 is in the heating mode, the door 24 is in the solid line position and the contact 86a is engaged with the contact 86b. This has the effect of shorting out the portion of the resistance element 73 above the slider 74 as viewed in the drawing. With the door 27 and slider 74 in their respective central positions, the voltage at the non-inverting input of the amplifier 77 which corresponds to the resistance of the portion of the potentiometer 72 which is not shorted out by the switch 86 is slightly lower than the voltage at the inverting input of the amplifier 77. The amplifier 77 produces a low negative voltage which turns on the transistor 84 to a small extent and allows a small amount of current to flow through the blower 16. This causes the blower 16 to be driven at low speed to provide a small amount of air flow.

However, if the sensed temperature is very low, the temperature control door 27 will be in the upper solid line position and the slider 74 of the potentiometer 72 will be moved downwardly close to the connection with the bus line 38. In this case, most of the resistance element 73 will be shorted out by the switch 86 and slider 74 and the resistance of the potentiometer 72 will be low. The voltage at the non-inverting input of the amplifier 77 will be much lower than the voltage at the inverting input thereof, and the amplifier 77 will produce a large negative output. The transistor 84 will be turned on to a large extent and allow a large amount of current to flow through the blower 16. The blower 16 will be driven at high speed to provide a large heating effect.

When the apparatus 11 is in the cooling mode, the door 24 is in the lower phantom line position to block the hot air outlet 23 and the movable contact 86a of the switch 86 engages with the fixed contact 86c. Movement of the door 27 downwardly from the central phantom line position to increase the cooling effect will cause the slider 74 of the potentiometer 72 to move upwardly. Since the switch 86 has been changed over, upward movement of the slider 74 will cause a progressively larger portion of the resistance element 73 to be shorted out. This will cause the blower 16 speed to increase in the same manner as downward movement of the slider 74 in the heating mode. Thus, the blower 16 speed is increased as the door 27 is moved away from the central position regardless of whether the movement is upward in the heating mode or downward in the cooling mode due to the changeover function of the switch 86.

Further illustrated is a switch 87 which is closed by a lug 88 carried by the rod 31 when the door 27 is in the lower phantom line position corresponding to maximum cooling mode operation. The switch 87 is connected in series with a relay coil 89 across the bus lines 37 and 38. The coil 89, when energized by closing of the switch 87, closes relay contacts 91 connected across the emitter and collector of the transistor 84. This has the effect of creating a short circuit across the transistor 84 in the maximum cooling mode.

Even when the transistor 84 conducts to a large extent, it still has some internal resistance which limits current flow therethrough and through the motor of the blower 16. However, the resistance of the contacts 91, when closed, is practically zero, and allows a maximum amount of current to flow through the motor of the blower 16. Thus, the blower 16 is driven at a highest possible speed in the maximum cooling mode which is higher than a maximum speed in the heating mode.

It is also possible to provide a manually operated switch 92 in parallel with the switch 87. The switch 92 is mounted in the vehicle cabin for manipulation by the operator. The blower 16 may be run at maximum speed in any mode of operation of the apparatus 11 by closing the switch 92.

In summary, it will be seen that the present invention overcomes the drawbacks of the prior art and provides a simplified but efficient vehicle air conditioning apparatus with automatic blower motor speed control. Various modifications will become possible for those skilled in the art after receiving the teachings of the present disclosure without departing form the scope thereof. For example, the present automatic blower motor speed control system may be adapted to air conditioning systems in which the temperature control door is manually rather than automatically positioned.

What is claimed is:

1. An air conditioning apparatus including an air flow duct formed with an outside air inlet, an inside air inlet, an upper cool air outlet and a lower hot air outlet, an inlet blocking door for blocking one of the outside and inside air inlets, a blower for forcing air through the duct, heating means for heating air in the duct, a temperature control door disposed in the duct for controlling air flow through a cooling means, cooling means for cooling air in the duct, an outlet blocking door for blocking one of the upper cool and lower hot air outlets, temperature sensor means and actuator means for positioning the temperature control door in accordance with an outlet of the temperature sensor means, characterized by comprising:

resistance means comprising a resistance element and a slider movable along the resistance element, the slider being connected to the temperature control door for integral movement in such a manner that the slider is in a central position on the resistance element when the temperature control door is in a central position;

blower drive means for driving the blower with an amount of power corresponding to a resistance of the resistance means; and switch means actuated by the outlet blocking door for connecting the slider to opposite ends of the resistance element when the temperature control door is on opposite sides of the central position thereof respectively.

2. An apparatus as in claim 1, further comprising a resistor connected in series with the resistance element across a power source, a junction of the resistor and resistance element being connected to the blower drive means.

3. An apparatus as in claim 2, in which the blower drive means comprises an amplifier and an electrical valve connected in series with the blower across the power source.

4. An apparatus as in claim 1, further comprising control means for energizing the cooling means when the temperature control door is on one of the opposite sides of the central position thereof and for energizing the heating means when the temperature control door is on another of the opposite sides thereof.

5. An apparatus as in claim 3, further comprising maximum cooling sensor means for sensing when the temperature control door is in a maximum position on said one of the opposite sides of the central position with the cooling means energized and shorting out the electrical valve in response thereto.

6. An apparatus as in claim 5, in which the maximum cooling sensor means comprises a switch.

7. An apparatus as in claim 3, in which the electrical valve comprises a transistor.

8. An apparatus as in claim 1, further comprising maximum cooling sensor means for sensing a maximum cooling condition of the cooling means and controlling the blower drive means to drive the blower with a maximum amount of power in response thereto.

* * * * *